United States Patent [19]

Travanti Corinti et al.

[11] Patent Number: 5,066,193
[45] Date of Patent: Nov. 19, 1991

[54] WATER PUMP HOUSING CLOSURE AND A WATER PUMP GASKET ADJUSTMENT MECHANISM

[75] Inventors: Mariano Travanti Corinti; Giovanni Nepi Campitelli, both of Caracas, Venezuela

[73] Assignee: Bombas Auriferas & Equipos Mineros B.A.E M., C.A., Caracas, Venezuela

[21] Appl. No.: 514,680

[22] Filed: Apr. 24, 1990

[51] Int. Cl.⁵ .................. F01D 1/00; F01D 25/00
[52] U.S. Cl. ...................... 415/201; 415/213.1; 415/214.1; 403/338
[58] Field of Search .................. 415/214.1, 224, 232, 415/203, 206, 182.1, 201, 213.1, 132; 285/421, 348; 403/338, 335, 378; 70/163, 166; 277/11, 136, 166, 189; 248/56; 220/323, 324

[56] References Cited

U.S. PATENT DOCUMENTS

| | | | |
|---|---|---|---|
| 1,947,148 | 2/1934 | Andersen | 415/201 |
| 2,707,920 | 5/1955 | Creasy | 415/201 |
| 3,130,678 | 4/1964 | Chenault | 415/201 |
| 4,291,195 | 9/1981 | Blomqvist et al. | 248/56 |

Primary Examiner—Edward K. Look
Assistant Examiner—Hoang Nguyen
Attorney, Agent, or Firm—Bachman & LaPointe

[57] ABSTRACT

The disclosure is related to centrifugal water pumps and consists of a union of lateral suction and support covers with the water pump housing by a plurality of non-screwing pressure elements and of an external gasket adjustment mechanism.

4 Claims, 2 Drawing Sheets

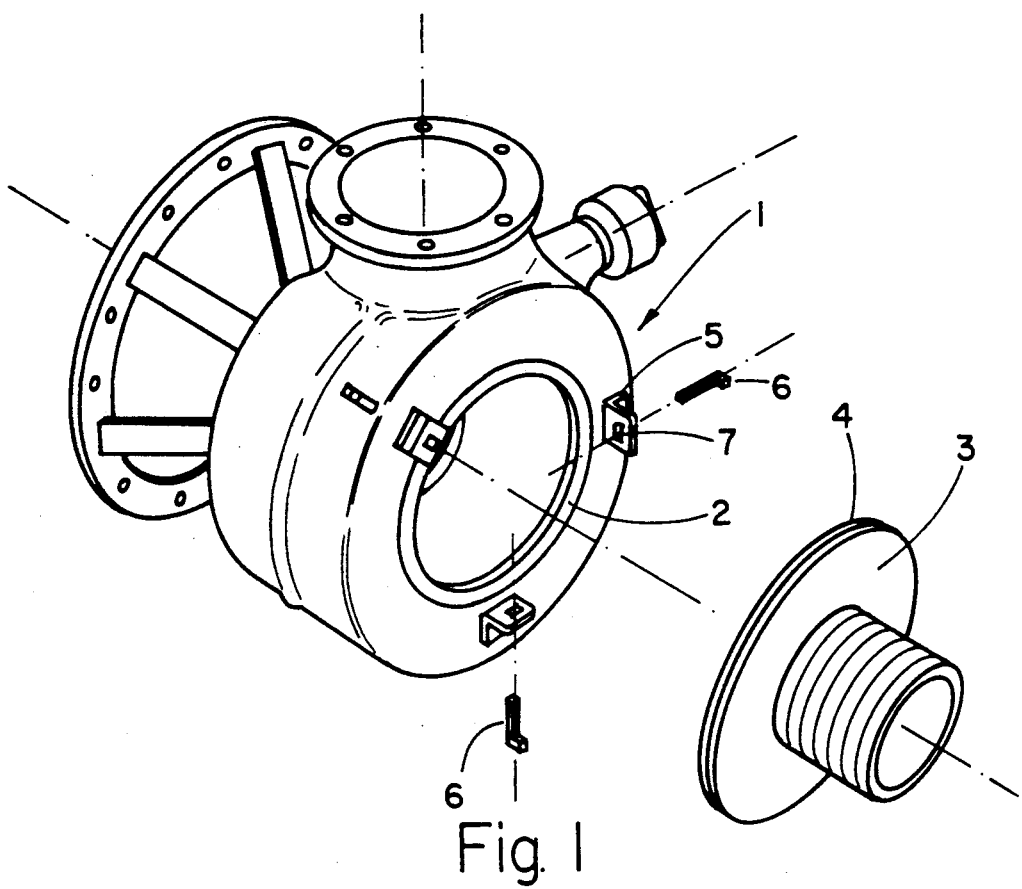
Fig. 1
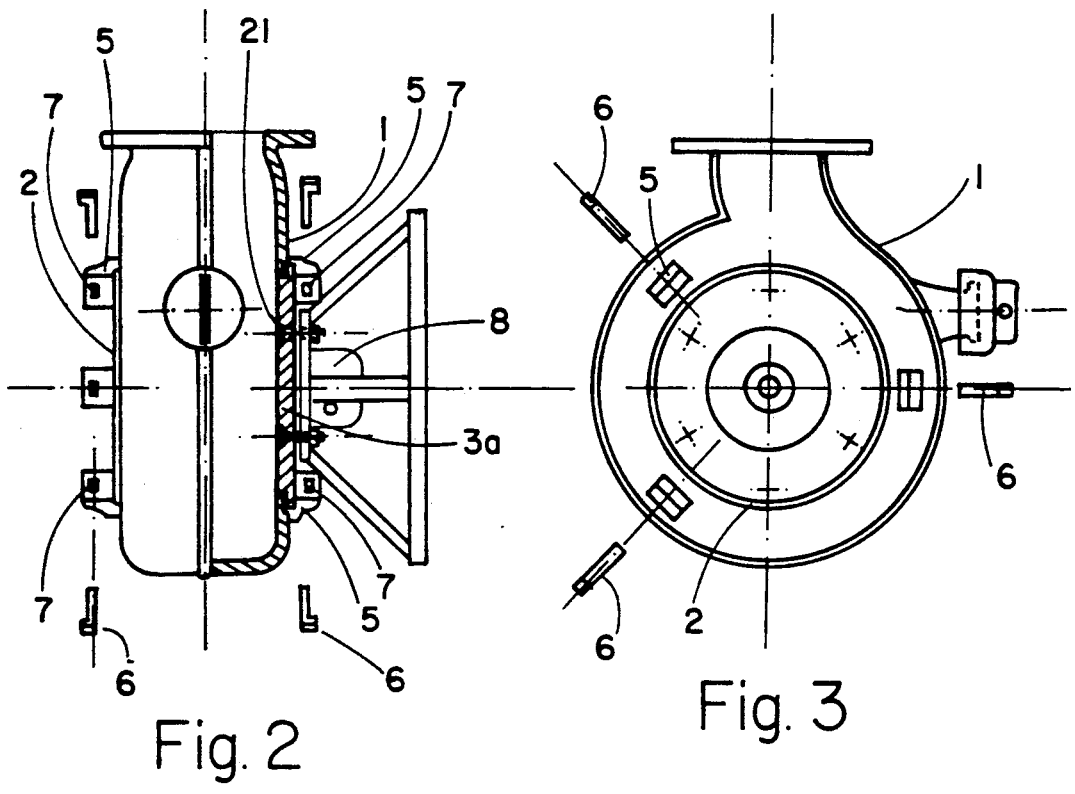
Fig. 2
Fig. 3

WATER PUMP HOUSING CLOSURE AND A WATER PUMP GASKET ADJUSTMENT MECHANISM

FIELD OF THE INVENTION

This invention is related to centrifugal water pumps and consists of a union of lateral covers with the water pump housing by means of non-screwing pressure elements and of an external gasket adjustment mechanism.

BACKGROUND OF THE INVENTION

All water pumps have covers providing access to the same in such a way that these covers are joined with a housing by means of screws. Water pumps working in different natural conditions, in remote areas, for example used in mining, require frequent disassembly of the covers to eliminate jams or for internal cleaning which is time consuming, especially when covers are joined with the housing by means of screws. After prolonged periods of use, the water pump gaskets suffer wear, causing leaks and requiring an interruption of use for replacement.

The present invention provides for the elements which eliminate these inconveniences. The first element allows rapid and easy assembly and disassembly of the lateral covers by eliminating the use of screws to join said covers. The second element allows external adjustment of the gasket and so avoiding leaks.

The objective of the present invention is to prolong the smooth functioning of the water pumps and facilitate rapid repair and maintenance in difficult working conditions.

BRIEF DESCRIPTION OF THE DRAWINGS

FIG. 1 is a perspective drawing of the housing and the suction cover which closes the access opening, showing the holding pins of said cover;

FIG. 2 is a lateral view of the housing cross-section and the holding pins;

FIG. 3 is a front view of the housing with the holding pins, shown as constituent parts;

FIG. 5 is a partial view in a longitudinal section of the part of the external gasket adjustment mechanism and an enlarged detail of this section showing the operation of the mechanism for adjusting the gasket.

DETAILED DESCRIPTION OF THE INVENTION

Figures 4, 5A, 5B:
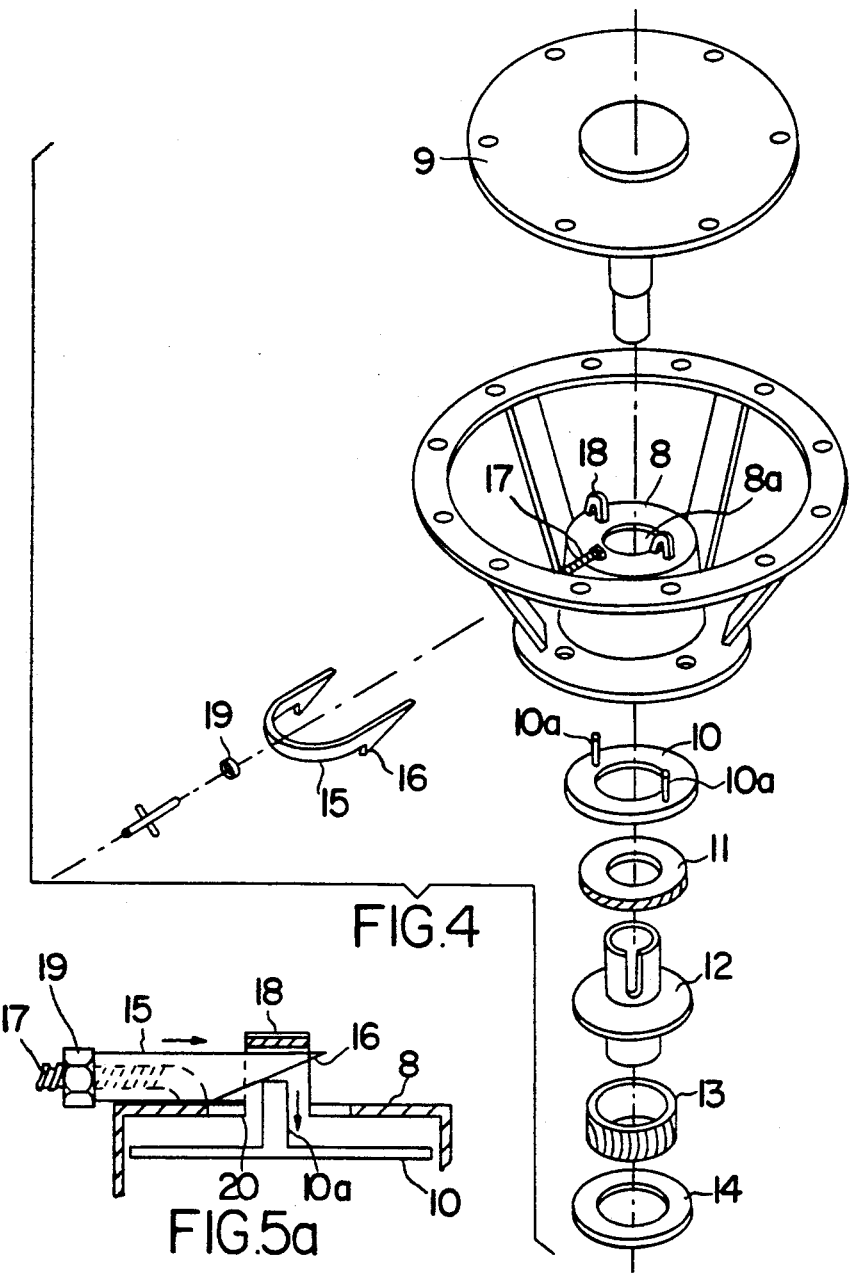
FIG. 4 is a view of the breakdown of a part of the pump external gasket adjustment mechanism.

FIGS. 1 to 4 show a water pump housing which comprises, on its external face opposite the motor connecting shaft (not shown), a circular access opening 2 which is plugged with a suction cover 3 with a bevelled edge 4, which fits into the opening 2. A unit with three L shaped projections 5 with openings 7 and located in the external adjacent surface around the opening 2 and along both opposite faces of the pump, each of which forms a unit containing pins 6 which may be inserted in the said openings 7 of the projections 5. The support cover 3a with a diameter equal to the opposite suction cover 3 has internal hexagonal cavities 21 for the insertion of each screw head which fasten the support of the pump by external nuts. Each of the L shaped projections 5 has a small rear inclination upwards which impedes the backward movement of the respective pin 6 and pressures the cover in the upper region. According to FIG. 5, along the motor connecting side, the pump has a conical body 8 integrally connected with the support cover 3a (see FIG. 2), with a tow guard 10 and with two vertical pins 10a, gaskets 11 and 13 on a coupling 12, and a support ring 14. A moving coupling plate 9 (see FIG. 4) is housed in the central cavity of the coupling 12 by means of a motor connecting shaft. The conical body 8 is comprised, in the surface around the opening for the motor connecting shaft 8a (see FIG. 4), of two opposite equidistant guide arcs 18 and at 90 degrees from these guide arcs 18 there is a threaded pin 17 with nuts 19, parallel to the said surface and extending from it, along which there is an external displaceable bushing 15, with bevelled ends 16, which move in turn with the guide arcs 18. Below these guide arcs 18 are openings 20 to provide access to the pins 10a of the tow guard 10. The functioning of the elements of the invention can be explained as follows: the suction and support covers 3 and 3a with their opposite lateral locations, have bevelled edges 4 which fit with the edges of the openings 2, and when in place allow the passing of the pins 6 along the openings 7 provided in the projections 5 of each lateral region. The insertion of these pins 6 whose ends rest on the external surface of the cover 3, will force bevelled edge 4 to make tight contact with the walls of the opening 2, forming a hermetic seal. The projections 5 in their rear part present a small upward sloping region which force the pin 6 to pressure forward against the cover 3 avoiding a loosening due to vibration of the pump.

It will be observed that due to the configuration of the pins 6, for their insertion or removal a tool such as a hammer will be sufficient and their handling will therefore be rapid and simple.

The adjustment of the gasket according to this invention is determined by the position of the tow guard 10 with its pins 10a, which project through the openings 20 (see FIG. 5) below the guide arcs 18. Since the bevelled end 16 of the bushing 15 rests on the projection pins 10a, in the guide arcs 18 and that this bushing 15 is movable along the threaded pin 17 by means of the nut 19, upon the tightening of this nut the bevelled ends 16 of the bushing 15 will force, in a cam effect and in a change of direction of the movement, the pins 10a to move along the shaft pressing the gaskets 11 and 13 and making them expand laterally, forming a gasket on the coupling 12 and the walls of the conical body 8.

As can be appreciated from what has been shown and due to the fact that the movement of the bushing 15 is uniform throughout and limited to straight movement due to the effect of the guides that the guide arcs 18 and the threaded pin 17 provide on which it moves, the movement transmitted to the pins 10a of the tow guard 10 will also be equally uniform and balanced also exerting uniform pressure on the group of internal gaskets in the conical body 8.

What is claimed is:

1. A water pump housing closure which consists of a housing having housing edges on lateral sides thereof, L shaped projections fixed to the housing, two suction and support covers which can be joined on both lateral sides of said housing said covers having bevelled edges to coincide with the housing edges joined hermetically by the pressure exerted by pins inserted in a radial direction through the L shaped projections which are fixed to the housing, said projections having openings for the insertion of said pins.

2. A water pump housing closure according to claim 1, wherein the suction and the support covers can be joined indistinctly on either lateral side of said housing.

3. A water pump gasket adjustment mechanism comprised of, a conical body integrally connected to a support cover, inside of which are housed a tow guard and two gaskets inserted on the shaft of a coupling whose end rests upon a support ring, and externally comprises a bushing inserted centrally in a threaded shaft which is propelled by means of an external nut, said bushing having a horseshoe shape with bevelled ends which pass perpendicularly through guide arcs intercepting two pins projecting from the tow guard which compresses an internal mechanism.

4. A water gasket adjustment mechanism according to claim 3, wherein two pins projecting from the tow guard above the plain of the conical body, and placed below the guide arcs, into which the bevelled ends of the adjustment bushing are inserted and through the contact of said bevelled ends the movement of said bushing applies uniform pressure upon the pins of the tow guard, internally compressing the gasket axially and expanding them perpendicularly forming a hermetic seal.

* * * * *